W. C. ANDERSON.
APPARATUS FOR SEPARATING SUBSTANCES OF DIFFERENT SPECIFIC GRAVITIES.
APPLICATION FILED JUNE 5, 1908.

1,025,231.           Patented May 7, 1912.

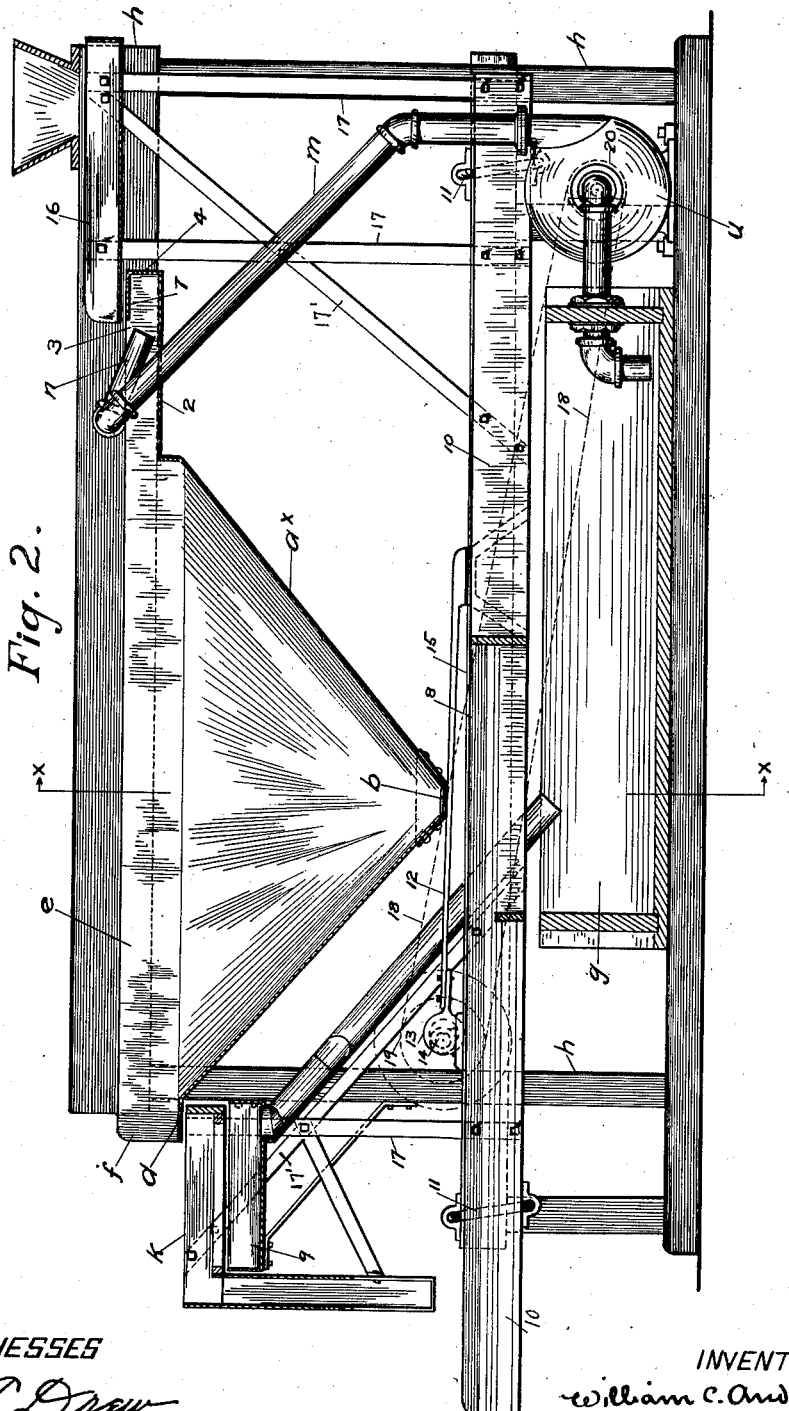

W. C. ANDERSON.
APPARATUS FOR SEPARATING SUBSTANCES OF DIFFERENT SPECIFIC GRAVITIES.
APPLICATION FILED JUNE 5, 1908.

Patented May 7, 1912.

WITNESSES

INVENTOR
William C. Anderson
by E. E. Osborn
ATTORNEY

UNITED STATES PATENT OFFICE.

WILLIAM C. ANDERSON, OF SAN JOSE, CALIFORNIA.

APPARATUS FOR SEPARATING SUBSTANCES OF DIFFERENT SPECIFIC GRAVITIES.

1,025,231.  Specification of Letters Patent.  Patented May 7, 1912.

Application filed June 5, 1908. Serial No. 436,970.

*To all whom it may concern:*

Be it known that I, WILLIAM C. ANDERSON, a citizen of the United States, and a resident of San Jose, in the county of Santa Clara and State of California, have invented new and useful Improvements in Apparatus for Separating Substances of Different Specific Gravities, of which the following is a specification.

This invention relates to improvements made in separating particles or substances of different specific gravities, by precipitating them in a body of water, whereby the lighter particles float on the surface and the heavier ones sink to the bottom.

The object of the present invention is chiefly to produce an apparatus or means for effecting automatically and in a continuous manner the separation of the good, merchantable raisins from the hard or imperfectly formed raisins which have been produced from the unripe fruit in the course of converting the fresh grapes into raisins, and which require to be separated from the good product before packing or preparing it for the market.

A further object of the invention is the production of an apparatus for separating, by a continuous operation, particles or substances having sufficient difference in specific gravity to cause the lighter particles to float and the heavier ones to sink when precipitated in a body of liquid such as water or brine.

To these ends and objects chiefly my said invention consists in certain novel construction and combination of separating tank, means for feeding or delivering the particles or substances to be separated, and means for producing a continuous inflow and outflow of the water or separating fluid, all as hereinafter more fully described and pointed out in the claims at the end of this specification.

The accompanying drawings referred to in the following description illustrate both a simple form or construction of the separating apparatus of my invention, and also an apparatus for floating raisins or separating the good from the hard, imperfectly formed raisins; the apparatus being constructed especially for carrying on the operation in a continuous manner and on a large scale, and with the view also to secure economy in the consumption of water.

Figure 1:
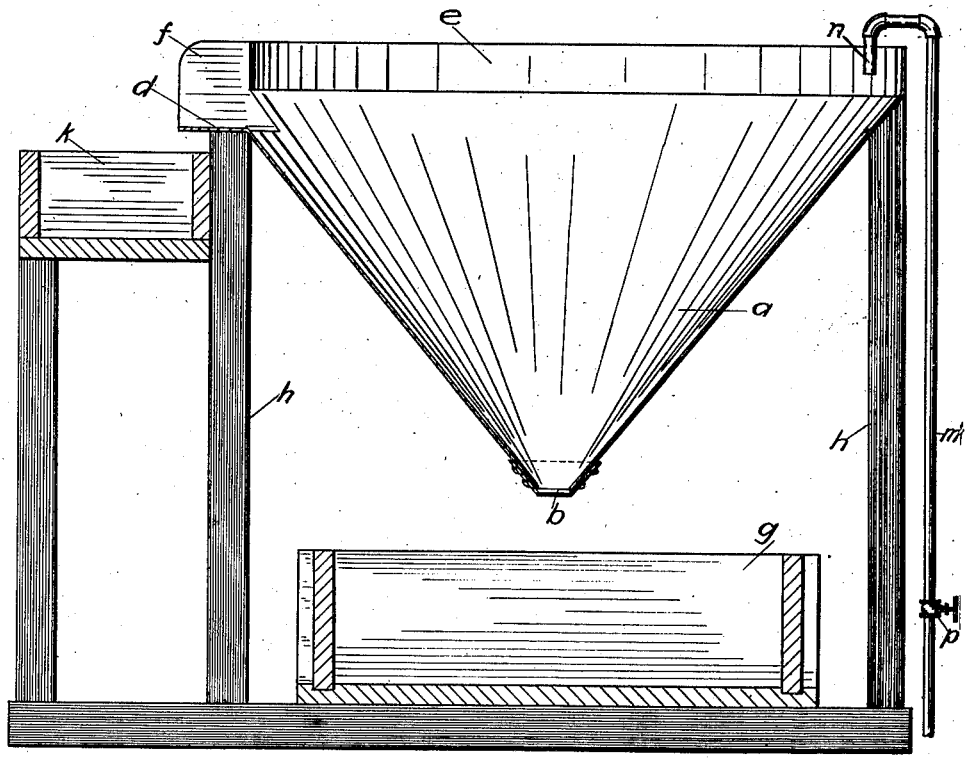
Figure 4:
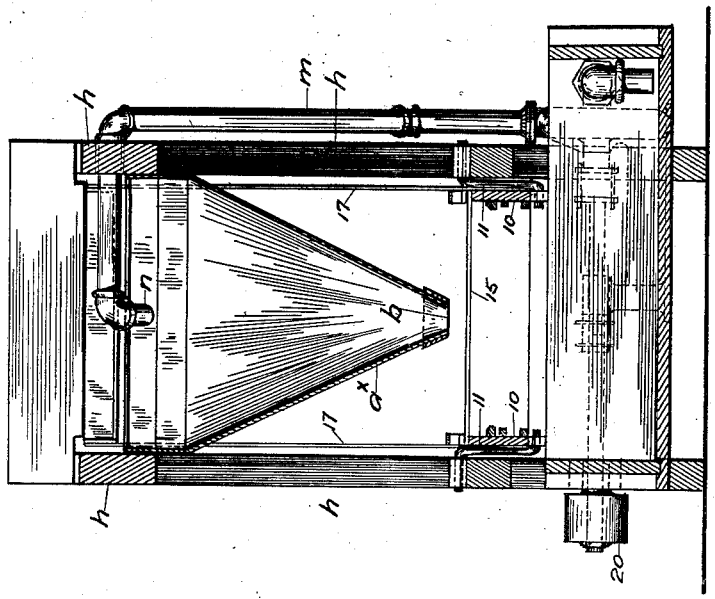
Figure 3:
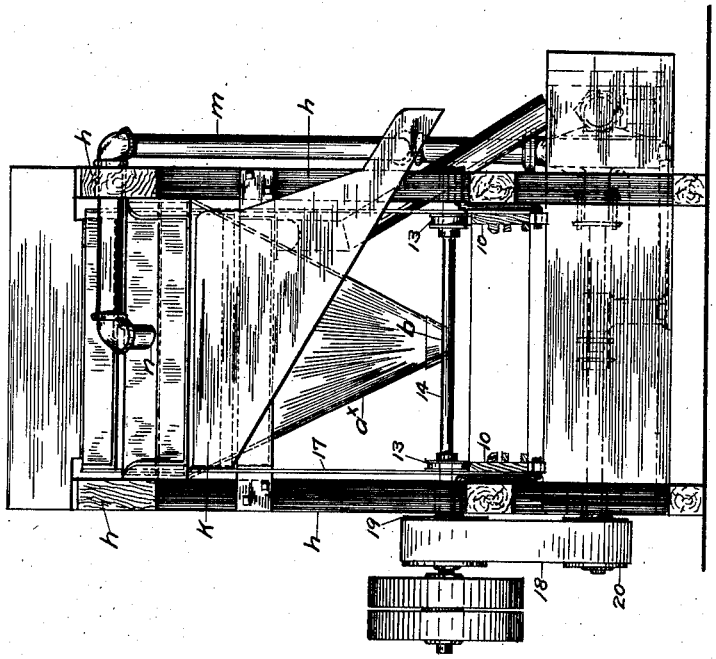

Figure 1 represents in elevation, a continuously operating separating apparatus adapted for separating particles of different specific gravities, such as the shells or husks from the meat of fruit pits and nuts which have been previously crushed to extract the kernels. Fig. 2 is a longitudinal sectional view of a separating apparatus constructed according to my invention and specially adapted for separating the good raisins from the worthless ones, and for operating on a large scale and with greater economy in the consumption of the separating liquid than is associated with the use of the apparatus illustrated in Fig. 1. Fig. 3 is an end-elevation of the apparatus seen in Fig. 2. Fig. 4 is a vertical transverse section taken on the line $x$—$x$ Fig. 2.

The part $a$ herein termed the separating tank is formed with sloping sides and ends converging to an outlet-aperture $b$ in the bottom, and with an over-flow outlet $d$ on one side, or end, below the standing rim $e$; the opposite sides being of the same dimensions and joining at right angles the ends, which are also of equal dimensions; thereby giving the tank a rectangular form in horizontal cross section. While this is the preferred form of the tank, it may be made with curved sides without the angles or corners that necessarily exist in the tank $a$ by reason of the sides and ends being flat. Instead of having a rectangular form or outline in horizontal cross-section, therefore, the shape of the tank may be circular or oblong in cross-section. A perpendicular extension of the sides and ends forms a standing rim around the top, excepting at the end or side where the outlet $d$ is provided, and at that point the rim extending outward forms standing sides $f$ to the spout.

The tank is fixed in upright position in a supporting frame $h$ with its outlet-aperture $b$ in the bottom situated over a trough $g$ in which are caught and collected the heavy particles that are carried out with the water through the outlet-aperture $b$, and a trough $k$ placed under the spout serves as a receptacle for the floating particles that pass off in the overflowing stream.

A water-pipe $m$ terminating in a nozzle $n$ is arranged for filling the tank to the overflow level and for supplying water in sufficient quantity during the operation to replace the quantity passing out through the outlet in the bottom, and so as to continuously maintain the water level somewhat above the line of the overflow outlet

*d*. A shut off valve *p* is provided in the pipe for controlling and regulating the flow of water into the tank. The pipe *m* connects with a source of supply not shown in the drawings, such as a water-main, a service-pipe or a storage-tank. A separating tank of this construction is well adapted for separating the husks or shells from the meat or kernels of apricot pits, fruit stones, almonds and nuts of various kinds that have been crushed to extract the kernels. It is also adapted for handling and operating on other particles or substances in bulk in which the particles to be separated have sufficient difference in their specific gravities for the lighter particles to float and be carried off by the surface overflow, and the heavier particles to sink and be carried out through the outlet at the bottom of the tank.

The separating apparatus of my invention as thus constructed will be seen to be continuous in its operation. The material or substances to be separated is fed or introduced in a continuous stream, and the separation taking place by virtue of the difference in the specific gravity of the particles, the lighter ones floating on the surface and the heavier ones sinking to the bottom, or being carried down to the outlet by the down-flowing water as the same finds escape through the outlet in the tank.

Provision is made for keeping up the level of the body of separating liquid in the tank in order to maintain a continuous surface over-flow whereby the floating particles or those that are in suspension in the water at or sufficiently near the surface will be carried off through the outlet *d*. This is the simplest construction or embodiment of my said invention.

The separating apparatus illustrated in Figs. 2, 3 and 4 is designed more particularly for carrying on the operation of floating raisins on a much larger scale than it has heretofore been possible to do by hand labor, and with greater economy in the consumption of water as the construction provides for using the same water over again a number of times instead of letting it run to waste.

This apparatus is adapted to handle a considerable quantity of raisins in bulk with such rapidity that while the raisins are immersed in the water during the operation of floating off the lighter particles they are carried through the tank and discharged at the outlet so quickly and continuously that they do not become soft, and are not affected by their short period of contact with the water.

As a means of returning the water from the collecting trough *g* to the tank *a* and keeping the water level to the required point during the operation of the apparatus I have employed to advantage a centrifugal pump *u* having its suction pipe set in the trough and its nozzle *n* arranged to deliver the water in a stream upon the surface of an apron 2 formed by the extension horizontally of the top of the tank at the side or end nearest the shaking tray. The surface of the apron 2 is about on a level with the working water-line of the tank, and the standing sides extending beyond the rim of the tank inclose the apron on the sides and across the back, as seen at 3—4. The nozzle *n* is set to deliver the water in a jet or continuous stream at an angle against the surface of the apron and with an inclination backward or toward the standing backwall 4 so as to be deflected and caused to have a forward impetus over the surface of the apron and into the tank. In such movement of the stream of water it is controlled and rendered more effective in its function of washing the raisins from the surface of the apron into the water of the tank by fixing over the end of the apron a deflecting plate 7 covering that portion of the apron over which the delivery end of the shaking tray extends. The raisins are thus dropped by the feeding movements of the tray to the surface of the apron 2 and in the way of the stream of water which as it issues from the nozzle is deflected in the opposite direction both by the bottom surface of the apron and also by the inclosing walls or sides 2—3—4 with the effect to carry the raisins and the particles or substances mixed with them off the apron and into the tank.

The advantage of feeding or bringing the water and the raisins and other substances together at their point of introduction to the tank or at the beginning of the operation is that the surfaces of the good and perfect raisins become quickly wet or moistened all over to such an extent or degree that they will sink below the surface and be carried down to the body of water that is constantly passing out of the tank through the outlet at the bottom, thereby insuring a rapid as well as a thorough separation of the heavy and the light particles or substances composing the material or matter being treated.

Between the outlet *b* and the trough *g* provided under the outlet for catching and collecting the water is interposed a screen 8 for the purpose of separating the raisins that have been carried out through the outlet, and leaving the water in condition to be returned to the tank. The screen provided for the purpose is preferably one having a vibratory or short reciprocating motion. A trough 9 is arranged also under the outlet spout to catch the overflow and return the water to the main water-box from which it is elevated to the top of the tank again by the pump as before described; and this additional trough is provided also with a screen that catches and retains the solid particles or substances, while the water passes through it and is carried off by the waste-pipe leading from the bottom of the trough into the water box below.

As the screens placed beneath the outlets will perform their function more rapidly if shaking screens are employed instead of stationary screens, I provide means for giving both screens a short vibratory motion from a continuously revolving shaft which also actuates the pumps and gives motion to the feeding-tray.

By mounting the trough $k$ and its screen under the overflow, upon the same frame that carries the main screens under the outlet $b$ and also mounting the feeding tray on the same frame, the vibratory movements of all these parts that require to be thus actuated can be produced from the motion of a single shaft through the medium of the eccentric on the shaft, and the eccentric-rod 12 connected to the carrying-frame 10, as seen in Fig. 2.

The frame 10 is suspended from the side-rails of the stationary frame by the four links 11 and the connecting rods 12 extending from the two eccentrics 13 on the shaft 14 are connected at the rods to the side-rails, there being preferably two eccentrics employed, in order to apply the motion equally to both sides of the frame, and insure an even rectilinear movement of the frame. The screen 15 set in this frame directly under the outlet in the bottom of the tank, is composed of two screening surfaces with the upper one of somewhat coarser mesh than the one beneath, when the raisins or other matter or substances being run through the apparatus require to be sorted or graded; otherwise a single screen, or a double screen of uniform mesh or size of apertures is fixed in the frame.

The feeding-tray 16 on one end of the suspended frame, and the trough $k$ on the opposite end are set on upright bars 17 and secured by braces 17′ to have suitable stiffness and rigid connection with the frame, as well as to elevate those parts above the frame to the required height for feeding into the tank over the rim, and for catching and carrying away the overflow at the outlet-spout. The same shaft that produces the vibrating movement of the frame is used to give motion to the pump; the connection being made by a belt 18 carried from a pulley 19 on the shaft, and a pulley on the runner 20 of the pump, when a centrifugal pump is employed, as shown in Fig. 2.

The apparatus will operate to better advantage in separating some kinds of substances or matter by using a liquid of greater density than water for the separating medium, for which purpose salt water or brine may be substituted for fresh water where the substance to be separated will not be affected or injured by immersion in such denser liquid.

I claim:—

1. In combination, a separating tank having a lower discharge for heavier material and an upper discharge for lighter material, a shaking drainer underlying said tank and receiving separated material from the lower discharge, said shaking drainer having a portion extending up in proximity to the tank, a tray upon said upstanding portion and partaking of the shake of the drainer and its upstanding portion, said tray overhanging the tank and adapted to feed material thereto.

2. In combination, a tank having an overflow outlet at one side, a relatively short substantially horizontal platform at the opposite side and delivering to the tank substantially in line with the overflow, means for delivering a current of water toward the end of said platform, means in proximity to said water delivery means for reversing the current and means for delivering the material upon said current in the region of agitation due to such reversal.

3. In combination, a tank having an overflow outlet at one side, a relatively short substantially horizontal platform at the opposite side and delivering to the tank substantially in line with the overflow, means for delivering a current of water toward the end of said platform, an end closure and a flange overhanging said platform in proximity to said water delivery means for reversing the current and means for delivering the material upon said current in the region of agitation due to such reversal.

WILLIAM C. ANDERSON.

Witnesses:
EDWARD E. OSBORN,
M. REGNER.